United States Patent
Abdelnur

(10) Patent No.: US 11,200,208 B2
(45) Date of Patent: Dec. 14, 2021

(54) REMOVING NON-DETERMINISTIC BEHAVIOR IN A CHANGE DATA CAPTURE MERGE

(71) Applicant: StreamSets, Inc., San Francisco, CA (US)

(72) Inventor: Alejandro Humberto Abdelnur, Barcelona (ES)

(73) Assignee: StreamSets, Inc., San Francisco, CA (US)

(*) Notice: Subject to any disclaimer, the term of this patent is extended or adjusted under 35 U.S.C. 154(b) by 150 days.

(21) Appl. No.: 16/738,896

(22) Filed: Jan. 9, 2020

(65) Prior Publication Data

US 2021/0216504 A1 Jul. 15, 2021

(51) Int. Cl.
*G06F 16/178* (2019.01)
*G06F 16/21* (2019.01)

(52) U.S. Cl.
CPC .......... *G06F 16/178* (2019.01); *G06F 16/214* (2019.01)

(58) Field of Classification Search
USPC ........................................................ 707/611
See application file for complete search history.

(56) References Cited

U.S. PATENT DOCUMENTS

| | | | | |
|---|---|---|---|---|
| 6,101,507 A | * | 8/2000 | Cane | G06F 11/1451 714/4.1 |
| 8,990,155 B1 | * | 3/2015 | Bayer | G06F 16/2322 707/610 |
| 2008/0010322 A1 | * | 1/2008 | Lee | G06F 16/184 |
| 2019/0102405 A1 | * | 4/2019 | Yang | H04L 67/02 |
| 2021/0064576 A1 | * | 3/2021 | Shemer | G06F 16/178 |

\* cited by examiner

*Primary Examiner* — Cam Linh T Nguyen
(74) *Attorney, Agent, or Firm* — Schwegman Lundberg & Woessner, P.A.

(57) ABSTRACT

Systems and methods herein describe accessing an original change data capture (CDC) dataset comprising information describing changes to a source database, the original CDC dataset comprising a plurality of entries; identifying a first entry of the plurality of entries comprising a primary-key, a first operation and entry data; identifying a set of entries in the plurality of entries that includes the primary-key; comparing the first operation of the first entry with a second operation of a second entry in the set of entries; updating the first operation and the entry data based on the comparison; generating a new entry based on the updating of the first operation and the entry data; storing the new entry in a consolidated CDC dataset; and applying the consolidated CDC dataset to a target database.

20 Claims, 4 Drawing Sheets

REMOVING NON-DETERMINISTIC BEHAVIOR IN A CHANGE DATA CAPTURE MERGE

TECHNICAL FIELD

Embodiments of the present disclosure relate to change data capture. More particularly, but not by way of limitation, the present disclosure addresses systems and methods for removing non-deterministic behavior in a change data capture merge.

BACKGROUND

Most transactional databases have the capability to expose changes to its data as Change Data Capture (CDC). In some examples, CDC data is an ordered list of (entity, operation, primary-key, data) tuples, where entity is the table for which data is being changed, operation is the type of change (e.g., INSERT, UPDATE, DELETE), the primary-key is the unique key identifying the data, and data is the data being changed.

For example, for "INSERT" operations, the data is data that is being added to a new row in a table in a target database. For "UPDATE" operations, the data is data that is being modified on an existing row in a table and the primary-key is used to find the row in the table in a target database. And, for "DELETE" operations, the primary-key is used to find and delete corresponding data from a table in a target database. Different SQL vendors support additional SQL operations such as "UPSERT," "UNDELETE," "REPLACE." These additional operations are also taken into account and handled by the system as described in further detail below.

Assuming that a source database and a target database are in sync with respect to their data at a given time, CDC data generated by new changes in the source database can be applied to the target database. After applying the CDC data to the target database, both databases will be synchronized.

When there is no CDC native integration between the source database and the target database, the CDC data is typically converted into INSERT, UPDATE, and DELETE SQL statements which are run in the target database. This may have significant performance implications for databases that are not optimized to perform individual SQL operations. Such databases may be used for data warehousing and analytics. These databases support high performance bulk upload commands that can handle CDC data. Example databases may provide a "MERGE SQL" operation extension for that purpose. MERGE may not be part of the standard SQL operations. The MERGE SQL operation allows execution of a 'single' bulk INSERT, UPDATE, and DELETE operation using a CDC dataset of an arbitrary large number of records.

However, if the CDC dataset has two UPDATE entries for the same record, or if the CDC dataset has an INSERT entry and a DELETE entry for the same record, there is no guarantee that changes for each record in question are applied in the correct order. Thus, the end results of the above mentioned situations are non-deterministic in nature.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A CDC dataset is an ordered list of (entity, operation, primary-key, data). The order of the CDC dataset is the order the changes were performed in a source database. As such, if an origin database and target database had the exact same data and changes are made to the data in the origin database, the CDC dataset produced by those changes can be applied one by one, in order, to the target database and the end result will be that the two databases (e.g., origin database and target database) are synchronized again.

If the CDC dataset has entries for the same data record and each entry (e.g., each tracked change) is applied one by one, the end result in the target database will be the expected result. However, if a system uses an SQL operation (e.g., MERGE SQL) to process, in bulk, a CDC dataset with more than one entry with the same primary-key, the end result will be non-deterministic as there is no guarantee in which order the MERGE SQL operation will process its input (e.g., the CDC dataset). Systems and methods discussed below describe removing non-deterministic behavior (e.g., a non-deterministic algorithm, that is f(n) levels, that even for the same input, can exhibit different behaviors on different runs) in a CDC merge by processing a CDC dataset to produce a consolidated CDC dataset, thereby producing a deterministic end result (e.g., a deterministic algorithm that performs f(n) steps that finishes with an accept or reject state and finishes with the same result). Further details regarding the systems and methods are described below.

Figure 1:
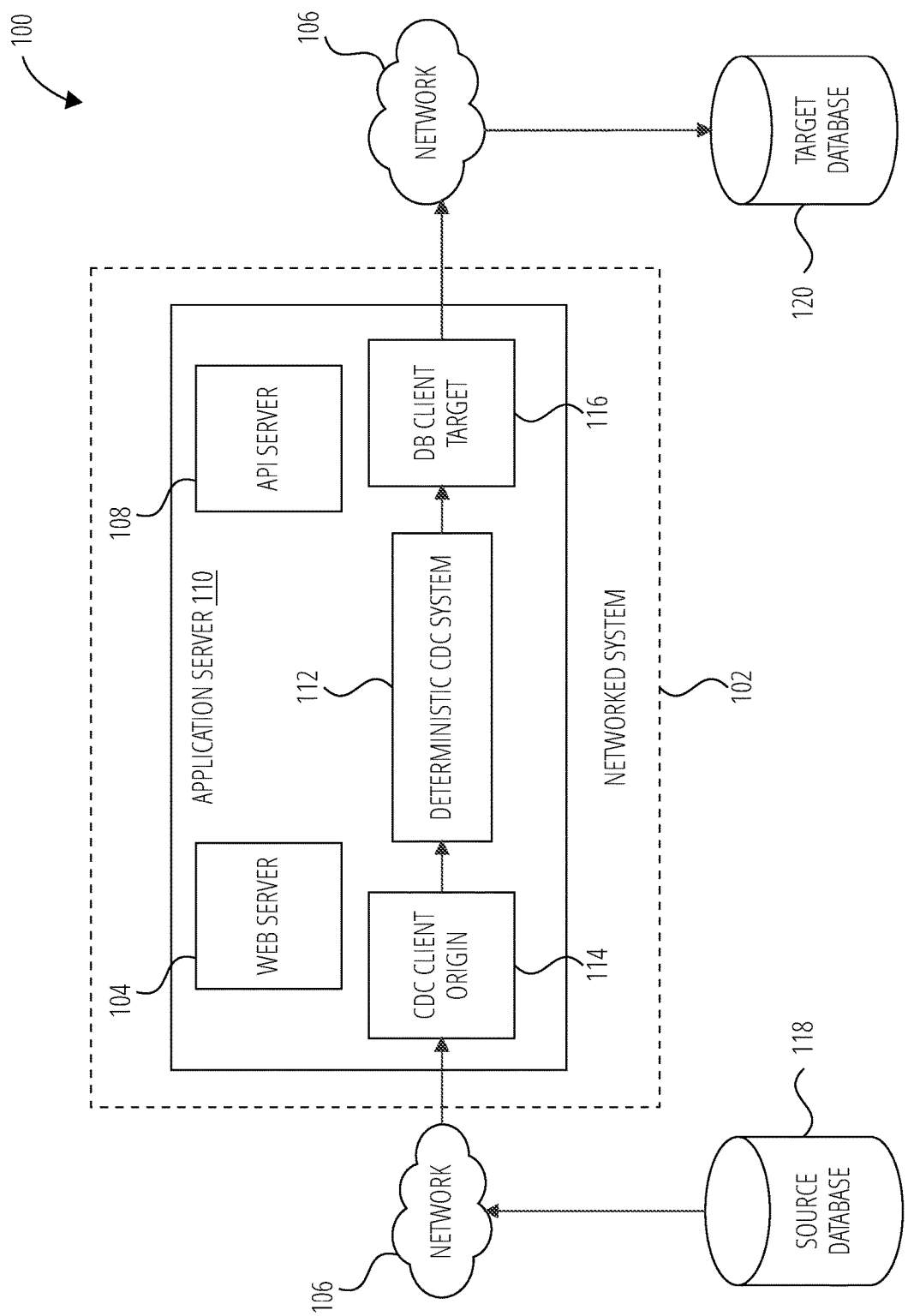
FIG. 1 is a network diagram depicting a computer system within which a deterministic CDC system may be deployed, according to some embodiments.

Turning now to FIG. 1, FIG. 1 is a network diagram depicting a network environment 100 within which one example embodiment of a deterministic CDC system 112 may be deployed, according to some embodiments. In some embodiments, the deterministic CDC system 112 may be used for data replication. For example, the deterministic CDC system 112 may be used to gather what currently exists in a source database 118 (referred to as historical load) and replicating transactions as records are created, updated, or deleted in the source database 118 going forward. Once the existing data has been loaded, change data capture is performed by reading the database change logs, and the deterministic CDC system 112 synchronizes the source database 118 with a target database 120.

A networked system 102, in the example embodiment, provides server-side functionality, via a network 106 (e.g., the Internet or Wide Area Network (WAN)), to one or more data storage systems (e.g., source database 118 and target database 120).

FIG. 1 illustrates, for example, a data pipeline with a CDC client origin 114 and database (DB) client target 116. For example, the CDC client origin 114 may be an ORACLE CDC client origin and the DB client target 116 may be a SNOWFLAKE destination. The CDC client origin 114 may be configured to be coupled to the source database 118 that has been loaded with historical data. For example, the CDC client origin 114 may use the same schema and criteria as the historical data. The DB client target 116 may, similarly, be configured as it was for the historical load. In some examples, the DB client target 116 may be configured differently that it was for the historical load. The DB client target 116 may update the target database 120 in real-time.

An Application Program Interface (API) server 108 and a web server 104 and provide programmatic and web interfaces respectively for, an application server 110. The application server 110 hosts the deterministic CDC system 112. The deterministic CDC system 112 may, thus, mine database logs, process transactions, and replicate database changes in the DB client target 116 in real-time. The application server 110 comprises the CDC client origin 114 and the DB client target 116 that, respectively, facilitate access to the source database 118 and the target database 120.

While the deterministic CDC system 112 is shown in FIG. 1 to form part of the networked system 102, it will be appreciated that, in alternative embodiments, the deterministic CDC system 112 may form part of a service that is separate and distinct from the networked system networked system 102.

Further, the network environment 100 is of course not limited to such an architecture as shown in FIG. 1, and could equally well find application in a distributed, or peer-to-peer, architecture system, for example. Any portion, or portions, of the deterministic CDC system 112 may reside and be executed from any kind of computing device. The deterministic CDC system 112 can also be implemented as standalone software program(s), which does not necessarily have networking capabilities.

Figure 2:
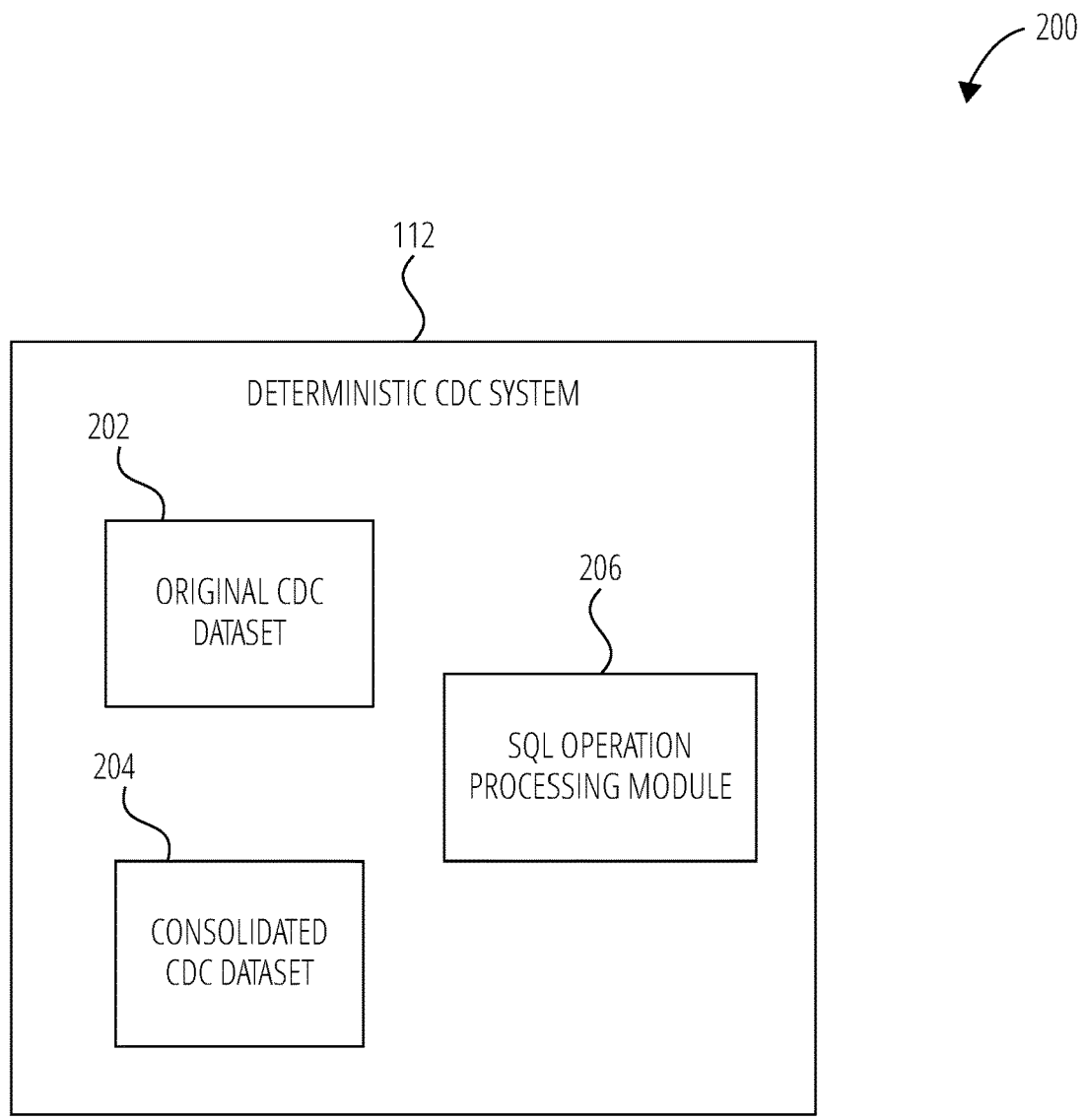
FIG. 2 is a block diagram showing components of the deterministic CDC system, according to some example embodiments.

FIG. 2 is a block diagram showing components of the deterministic CDC system, according to some example embodiments. The deterministic CDC system 112 comprises an original CDC dataset 202, a consolidated CDC dataset 204, and a SQL operation processing module 206.

The original CDC dataset 202 may be a CDC dataset with an ordered list of (entity, operation, primary-key, data) tuples. In example embodiments, the order of the original CDC dataset 202 is the order the changes were performed in the source database 118.

The SQL operation processing module 206 supports functionalities for processing SQL operations such as, but not limited to, INSERT, UPDATE, DELETE, UPSERT, UNDELETE, and REPLACE. The SQL operation processing module 206 may comprise logic for handling SQL operations in the order defined by the original CDC dataset 202.

The consolidated CDC dataset 204 is the resulting CDC dataset produced by the deterministic CDC system 112. The consolidated CDC dataset 204 may be applied to the target database 120 to synchronize the target database 120 with the source database 118. Applying the consolidated CDC dataset 204 to the target database 120 may produce the same end result as applying the original CDC dataset 202 to the target database 120. However, the consolidated CDC dataset 204 does not have more than one entry with the same primary-key.

For example, a source database 118 and target database 120 contains the following dataset as shown in Table 1.

TABLE 1

| entity | primary-key | data |
|--------|-------------|------|
| USER | Mike | age = 50 |
| USER | Joe | age = 18 |

The original CDC dataset 202 describing changes to the source database 118, ordered by time of the change occurrence contains the following dataset depicted in Table 2.

TABLE 2

| entity | operation | primary-key | data |
|--------|-----------|-------------|------|
| USER | INSERT | Mary | age = 20 |
| USER | UPDATE | Joe | age = 30 |
| USER | INSERT | John | age = 40 |
| USER | DELETE | Joe | |
| USER | UPDATE | John | age = 35 |
| USER | INSERT | Joe | age = 25 |
| USER | UPDATE | Mary | age = 28 |
| USER | DELETE | John | |

Thus, the expected end result of applying the original CDC dataset 202 (e.g., Table 2) to a target database 120 (e.g., Table 1) is the following dataset depicted in Table 3.

TABLE 3

| entity | primary-key | data |
|--------|-------------|------|
| USER | Mike | age = 50 |
| USER | Mary | age = 28 |
| USER | Joe | age = 25 |

The deterministic CDC system 112 iterates over the original CDC dataset 202 and creates a consolidated CDC dataset 204 with a single entry with the same primary-key that is equivalent to the original CDC dataset 202 when applied to the target database 120. The deterministic CDC system 112 identifies all entries with the same primary-key and for each set of entries with the same primary-key. For each set of entries with the same primary-key, the deterministic CDC system 112 resolves all the operations into a single operation.

For example, for the primary-key "Mary," an INSERT operation followed by an UPDATE operation (as depicted in Table 2) can be converted into a single INSERT operation using the data from the UPDATE operation and added to the consolidated CDC dataset 204 as:

TABLE 4

| entity | operation | primary-key | data |
|--------|-----------|-------------|------|
| USER | INSERT | Mary | age = 28 |

For the primary-key "Joe," an UPDATE operation followed by a DELETE operation then followed by an INSERT operation (as depicted in Table 2) can be converted into a single INSERT operation using the data from the second INSERT operation and added to the consolidated CDC dataset 204 as:

TABLE 5

| entity | operation | primary-key | data |
|---|---|---|---|
| USER | INSERT | Joe | age = 25 |

For the primary-key "John," an INSERT operation followed by an UPDATE operation, followed by a DELETE operation can be converted to a single 'DELETE operation and completely removed from the consolidated CDC dataset 204:

TABLE 6

| entity | operation | primary-key | data |
|---|---|---|---|

Thus, the final consolidated CDC dataset 204 is:

TABLE 7

| entity | operation | primary-key | data |
|---|---|---|---|
| USER | INSERT | Mary | age = 28 |
| USER | INSERT | Joe | age = 25 |

If the consolidated CDC dataset 204 (illustrated in Table 7) is applied to the target database 120 (illustrated in Table 1), the end result will be identical to the end result of applying the original CDC dataset (illustrated in Table 2) one entry at a time to the target database 120.

A difference between the original CDC dataset 202 (illustrated in Table 2) and the consolidated CDC dataset 204 (illustrated in Table 8) is that the latter does not have more than one database entry with the same primary-key. Thus, having no duplicate primary-keys in the consolidated CDC dataset 204 makes the system deterministic.

Figure 3:
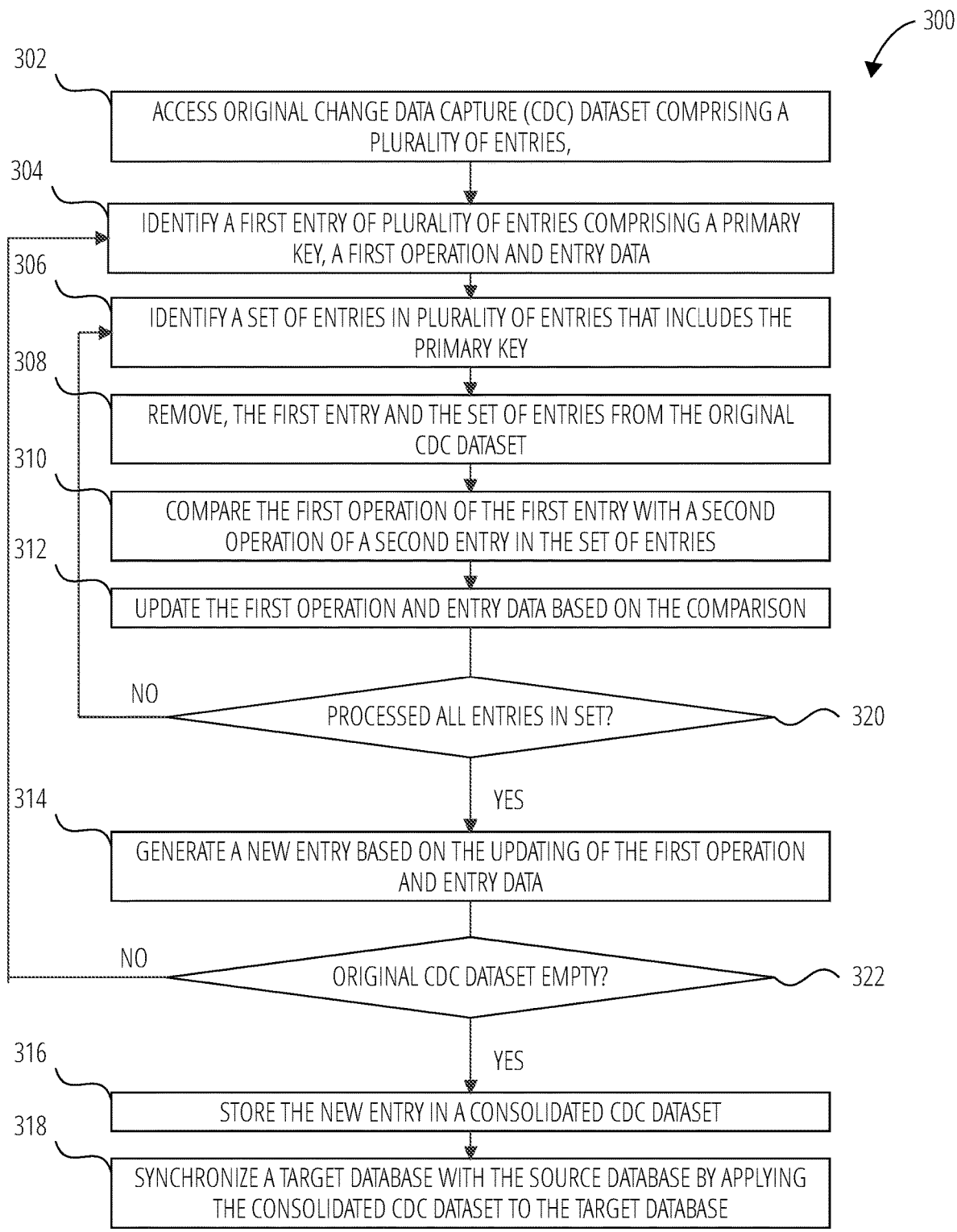
FIG. 3 is a flowchart of a method for removing non-deterministic behavior in a change data capture merge, according to some example embodiments.

FIG. 3 is a flowchart of an example method 300 for removing non-deterministic behavior in a change data capture merge, according to some example embodiments. Operations in the method 300 are performed by the networked system 102, using components described above with respect to FIG. 1 and FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, the deterministic CDC system 112 accesses an original change data capture (CDC) dataset comprising information describing changes to a source database, wherein the original CDC dataset comprises a plurality of entries. In example embodiments, the accessed original change data capture (CDC) dataset is the original CDC dataset 202.

While the original CDC dataset 202 is not empty, the deterministic CDC system 112 iterates through operations 304, 306, 308, 310, 312, 320, and 314. In operation 304, the deterministic CDC system 112 identifies an entry of the plurality of entries. The entry comprises a primary key and an operation. In some cases, the entry may also include entry data.

In operation 306, the deterministic CDC system 112 identifies any other entries in the plurality of entries that includes the same primary key as the first entry. If the original CDC dataset 202 contains only one entry, the deterministic CDC system stores the only one entry as a new entry in the consolidated CDC dataset. Assuming there are other entries with the same primary-key, the deterministic CDC system 112 iterates through operations 306, 308, 310 and 312 until all entries having the same primary-key have been processed.

In operation 308, the deterministic CDC system 112 removes the entry and any other entries having the same primary-key from the original CDC dataset.

In operation 310, the deterministic CDC system 112 compares the operation of the entry with a second operation of a second entry in the set of entries.

In operation 312, method 300 updates the first operation and the entry data based on the comparison. For example, if the first entry is empty and a second entry is an INSERT operation, the SQL operation processing module 206 updates the first operation to an INSERT and updates the first entry data of the first data with second entry data of the second entry.

If the first operation of the first entry is an INSERT operation and the second operation of the second entry is an UPDATE operation, the SQL operation processing module 206 maintains the first operation as an INSERT and updates the first entry data of the first data with the second entry data of the second entry.

In some examples, if the first operation of the first entry was an INSERT operation and the second operation of the second entry is a DELETE operation, the SQL operation processing module 206 removes the first entry.

If the first operation is a DELETE operation and the second operation is an INSERT operation, the SQL operation processing module 206 updates the first operation to an UPDATE operation and updates the first entry data with the second entry data. In some examples, all data values not currently defined in the second entry may be set to NULL.

If the first operation is an UPDATE operation and the second operation is a DELETE operation, the SQL operation processing module 206 removes the first entry.

If the first operation is an UPDATE operation and the second entry is an UPDATE operation, the SQL operation processing module 206 maintains the first operation as an UPDATE operation and updates the first entry data of the first data with second entry data of the second entry.

In some embodiments, any other combination of operations between the first entry and the second entry may output an error to the deterministic CDC system 112. In some embodiments, operations 304-310 may be performed by the SQL operation processing module 206.

Although the above paragraphs describe the SQL operation processing module 206 using basic SQL operations INSERT, UPDATE, and DELETE, it is to be understood that a person having ordinary skill in the art may extend the SQL operation processing module 206 to support semantics of additional SQL operations (e.g., "UPSERT," "UNDELETE," "REPLACE").

At operation 320, the deterministic CDC system 112 determines whether all entries in the identified set of entries that includes the primary-key. If the deterministic CDC system 112 determines that not all entries in the identified set have been processed, the deterministic CDC system 112 repeats operations 306, 308, 310 and 312. If the deterministic CDC system 112 determines that all entries have been processed, method 300 proceeds to operation 314.

In operation 314, the deterministic CDC system 112 generates a new entry based on the updating of the first operation and the entry data. For example, the new entry may be generated based on the updating of the first operation and the entry data by the SQL operation processing module 206 as described above.

At operation 322, the deterministic CDC system 112 determines whether the original CDC dataset is empty. If the deterministic CDC system 112 determines that the original CDC dataset is not empty, the method 300 repeats operations 304-314. If the deterministic CDC system 112 determines that the original CDC dataset is empty, the method 300 proceeds to operation 316.

In operation 316, the deterministic CDC system 112 stores the new entry in a consolidated CDC dataset. For example, the consolidated CDC dataset may be the consolidated CDC dataset 204. Thus, each entry in the consolidated CDC dataset contains a unique primary-key.

In operation 318, the deterministic CDC system 112 synchronizes a target database with the source database by applying the consolidated CDC dataset to the target database.

Figure 4:
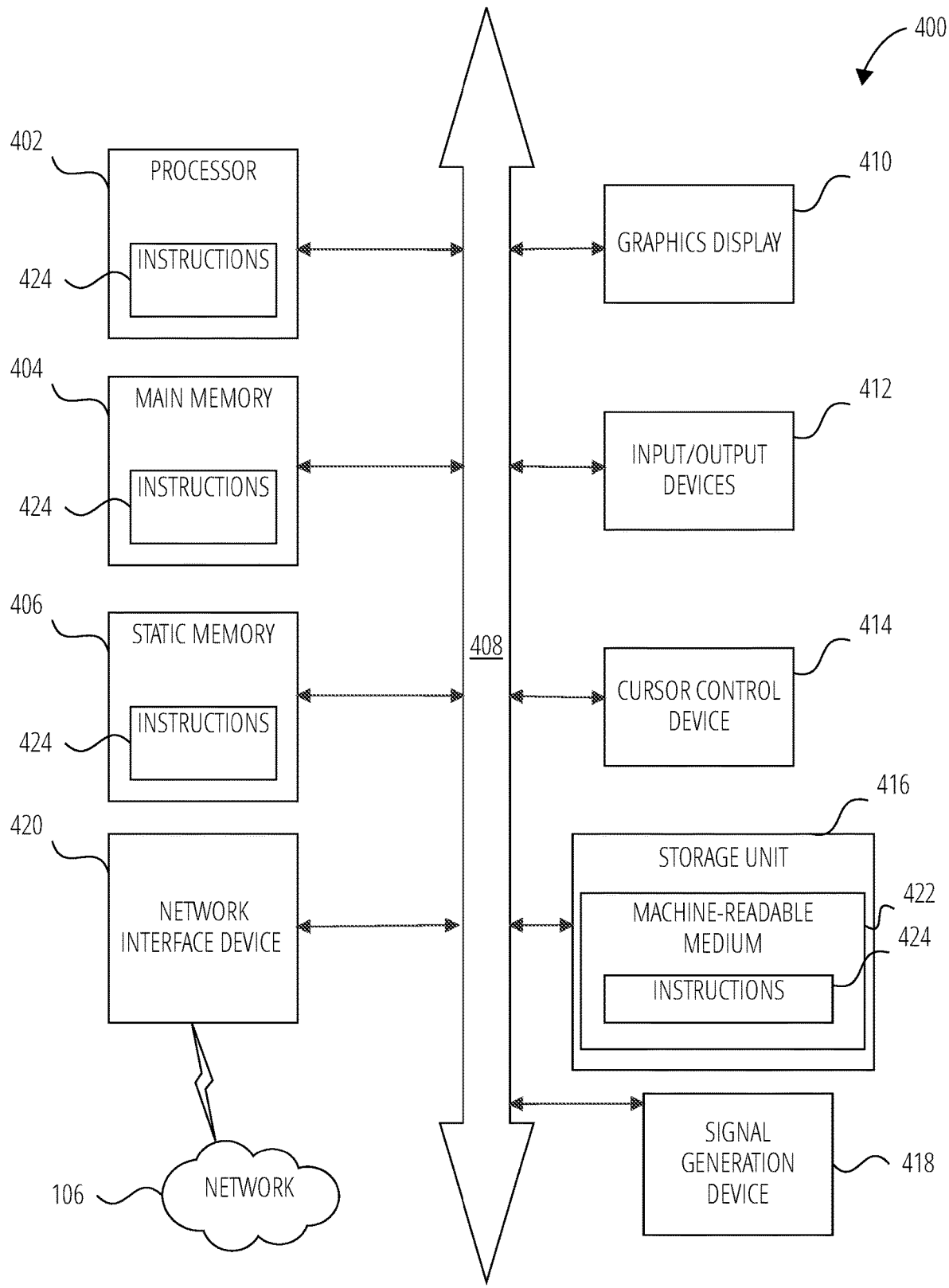
FIG. 4 shows a diagrammatic representation of a machine in the example form of a computer system within which a set of instructions, for causing the machine to perform any one or more of the methodologies discussed herein, may be executed, according to some example embodiments.

FIG. 4 illustrates components of a machine 400, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 4 shows a diagrammatic representation of the machine 400 in the example form of a computer device (e.g., a computer) and within which instructions 424 (e.g., software, a program, an application, an applet, an app, or other executable code) for causing the machine 400 to perform any one or more of the methodologies discussed herein may be executed, in whole or in part.

For example, the instructions 424 may cause the machine 400 to execute the flow diagram of FIG. 3. In one embodiment, the instructions 424 can transform the general, non-programmed machine 400 into a particular machine (e.g., specially configured machine) programmed to carry out the described and illustrated functions in the manner described.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a peer-to-peer (or distributed) network environment. The machine 400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 424 (sequentially or otherwise) that specify actions to be taken by that machine. Further, while only a single machine is illustrated, the term "machine" shall also be taken to include a collection of machines that individually or jointly execute the instructions 424 to perform any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, or a cathode ray tube (CRT), or any other display capable of displaying graphics or video). The machine 400 may also include an alphanumeric input device 412 (e.g., a keyboard), a cursor control device 414 (e.g., a mouse, a touchpad, a trackball, a joystick, a motion sensor, or other pointing instrument), a storage unit 416, a signal generation device 418 (e.g., a sound card, an amplifier, a speaker, a headphone jack, or any suitable combination thereof), and a network interface device 420.

The storage unit 416 includes a machine-readable medium 422 (e.g., a tangible machine-readable storage medium) on which is stored the instructions 424 (e.g., software) embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered as machine-readable media (e.g., tangible and non-transitory machine-readable media). The instructions 424 may be transmitted or received over a network 106 via the network interface device 420.

In some example embodiments, the machine 400 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 404, 406, and/or memory of the processor(s) 402) and/or storage unit 416 may store one or more sets of instructions and data structures (e.g., software) 424 embodying or utilized by any one or more of the methodologies or functions described herein. These instructions, when executed by processor(s) 402 cause various operations to implement the disclosed embodiments.

As used herein, the terms "machine-storage medium," "device-storage medium," "computer-storage medium" (referred to collectively as "machine-storage medium 422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 422 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 424 may further be transmitted or received over a communications network 106 using a transmission medium via the network interface device 420 and utilizing any one of a number of well-known transfer protocols (e.g., HTTP). Examples of communication networks 106 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 424 for execution by the machine 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    accessing an original change data capture (CDC) dataset comprising information describing changes to a source database, the original CDC dataset comprising a plurality of entries;
    identify a first entry in the plurality of entries, the first entry comprising a primary-key, a first operation and entry data;
    identifying a set of entries in the plurality of entries that includes the primary-key;
    removing, the first entry and the set of entries from the original CDC dataset;
    comparing the first operation of the first entry with a second operation of a second entry in the set of entries;
    updating the first operation and the entry data based on the comparison;
    generating a new entry based on the updating of the first operation and the entry data;
    storing the new entry in a consolidated CDC dataset; and
    synchronizing a target database with the source database by applying the consolidated CDC dataset to the target database.

2. The method of claim 1, wherein applying the consolidated CDC dataset to the target dataset is in response to determining the original CDC dataset is empty.

3. The method of claim 1, wherein the first entry further comprises an entity.

4. The method of claim 1, wherein each entry in the consolidated CDC dataset has a unique primary-key.

5. The method of claim 1, wherein the first operation of the first entry describes a type of change applied to the entry data.

6. The method of claim 1, wherein the identified set of entries in the plurality of entries is an ordered list.

7. The method of claim 6, wherein the ordered list matches the order the changes were performed in the source database.

8. A computing apparatus comprising:
    a processor; and
    a memory storing instructions that, when executed by the processor, configure the apparatus to perform operations comprising:
    accessing an original change data capture (CDC) dataset comprising information describing changes to a source database, the original CDC dataset comprising a plurality of entries;
    identify a first entry in the plurality of entries, the first entry comprising a primary-key, a first operation and entry data;
    identifying a set of entries in the plurality of entries that includes the primary-key;
    removing, the first entry and the set of entries from the original CDC dataset;
    comparing the first operation of the first entry with a second operation of a second entry in the set of entries;
    updating the first operation and the entry data based on the comparison;
    generating a new entry based on the updating of the first operation and the entry data;
    storing the new entry in a consolidated CDC dataset; and
    synchronizing a target database with the source database by applying the consolidated CDC dataset to the target database.

9. The computing apparatus of claim 8, wherein applying the consolidated CDC dataset to the target dataset is in response to determining the original CDC dataset is empty.

10. The computing apparatus of claim 8, wherein the first entry further comprises an entity.

11. The computing apparatus of claim 8, wherein each entry in the consolidated CDC dataset has a unique primary-key.

12. The computing apparatus of claim 8, wherein the first operation of the first entry describes a type of change applied to the entry data.

13. The computing apparatus of claim 8, wherein the identified set of entries in the plurality of entries is an ordered list.

14. The computing apparatus of claim 13, wherein the ordered list matches the order the changes were performed in the source database.

15. A non-transitory computer-readable storage medium, the computer-readable storage medium including instructions that when executed by a computer, cause the computer to perform operations comprising:
  accessing an original change data capture (CDC) dataset comprising information describing changes to a source database, the original CDC dataset comprising a plurality of entries;
  identify a first entry in the plurality of entries, the first entry comprising a primary-key, a first operation and entry data;
  identifying a set of entries in the plurality of entries that includes the primary-key;
  removing, the first entry and the set of entries from the original CDC dataset;
  comparing the first operation of the first entry with a second operation of a second entry in the set of entries;
  updating the first operation and the entry data based on the comparison;
  generating a new entry based on the updating of the first operation and the entry data;
  storing the new entry in a consolidated CDC dataset; and
  synchronizing a target database with the source database by applying the consolidated CDC dataset to the target database.

16. The computer-readable storage medium of claim 15, wherein applying the consolidated CDC dataset to the target dataset is in response to determining the original CDC dataset is empty.

17. The computer-readable storage medium of claim 15, wherein the first entry further comprises an entity.

18. The computer-readable storage medium of claim 15, wherein each entry in the consolidated CDC dataset has a unique primary-key.

19. The computer-readable storage medium of claim 15, wherein the identified set of entries in the plurality of entries is an ordered list.

20. The computer-readable storage medium of claim 19, wherein the ordered list matches the order the changes were performed in the source database.

* * * * *